Jan. 25, 1966 P. DANNENMANN 3,231,768
ELECTROMOTOR
Filed Feb. 19, 1962
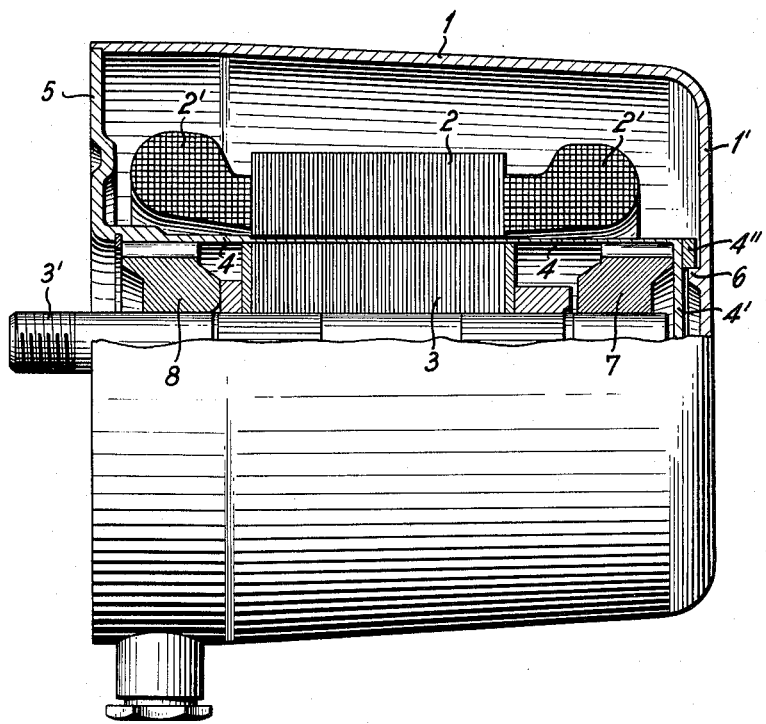
INVENTOR
PAUL DANNENMANN
By Hane and Nydick
ATTORNEYS 3,231,768
ELECTROMOTOR
Paul Dannenmann, Welzheim-Wurttemberg, Germany, assignor to G. Bauknecht G.m.b.H., Stuttgart, Germany, a limited partnership of Germany
Filed Feb. 19, 1962, Ser. No. 174,018
Claims priority, application Germany, Feb. 21, 1961, B 61,370
5 Claims. (Cl. 310—86)

The present invention relates to electromotors and more particularly to electromotors in which the stator and the rotor are housed in a generally cup-shaped casing closed at its open end by a cover supporting the bearing for the rotor, and the stator is sealed in the casing by a sealing tube fitted in the gap between the stator and the rotor.

Electromotors of this kind are frequently operated submerged in liquid, for instance when used as part of an underwater pump. Due to such and similar operational conditions, the stator must be moisture-sealed, and it has been found that a liquid-tight mounting of the aforementioned sealing tube presents considerable difficulties. The rotor, usually a squirrel cage rotor or a short circuit rotor, is insensitive to water or moisture and hence need not be protected.

It is the broad object of the invention to provide a novel and improved electromotor of the general kind above referred to in which an entirely satisfactory moisture protection of the stator by the sealing tube is attained without requiring the special sealing means heretofore necessary.

A specific object of the invention is to provide a novel and improved electromotor of the general kind above referred to, the manufacture and assembly of which are considerably simpler and less expensive than that of such electromotors as heretofore known.

Another specific object of the invention is to provide a novel and improved electromotor of the general kind above referred to in which the sealing tube itself supports the bearing for the rotor shaft, thereby further simplifying the manufacture and assembly of the motor.

The aforementioned objects, features and advantages and other objects, features and advantages which will be pointed out hereinafter are attained by making the casing cover and the sealing tube out of one piece, thus eliminating the need for special sealing means between the cover and the tube.

According to one form of the invention, the casing cover and the sealing tube are integrally formed by any suitable technique known in the art of forming materials by pressing, deep drawing or the like, so-called thermosetting plastics as also nonmagnetic metals or metals of magnetically bad conductivity.

According to another form of the invention, the sealing tube is formed with an integral bottom wall thereby eliminating the need for special sealing means not only at the casing cover but a the inner end of the tube also.

According to still another form of the invention, the portion of the sealing tube adjacent to the cover but still outside the gap between the stator and the rotor is reinforced so that the tube is capable of supporting the rotor bearing, thus eliminating the need for a special collar or similar means for supporting the bearing, and also reducing the total length of the motor.

According to a further form of the invention, the sealing tube is mounted slightly lengthwise displaceable but transversely restrained at its inner end to allow for expansion or contraction of the tube due to changes in the temperature and to prevent vibrations of the tube at its inner end.

In the single figure of the accompanying drawing a longitudinal partly sectional view of an electromotor according to the invention is shown.

The exemplified motor according to the invention comprises a cup-shaped casing 1 in which is mounted a stator 2 having a winding 2', and a rotor 3. The stator and the rotor are separated by a circumferential air gap and a sealing tube 4 is extended through said gap. Tube 4 is integral with a closure member or cover 5 which closes the open end of casing 1 and is secured thereto by any suitable means. As mentioned before, the cover and the tube are formed out of one piece, preferably one piece of plastic. Since cover 5 and tube 4 are liquid-tight joined to each other, no special sealing means are necessary between the cover and the tube. The inner end of tube 4, that is the end adjacent to the bottom 1' of casing 1, is closed by a bottom wall 4' integral with the side wall of the tube so that sealing means between the tube bottom 4' and the tube 4 are not necessary.

A ring flange 4'' is secured to the outside of bottom wall 4' coaxial with the longitudinal axis of tube 4. The ring flange overlies a ring shoulder 6 protruding from casing bottom 1' so that the tube assembly can perform slight axial movements in reference to shoulder 6, to compensate for changes in the length of tube 4 due to expansion and contraction.

The motor shaft 3' which supports rotor 3 is journaled in bearings 7 and 8 fitted in tube 4. Bearing 7 is mounted closely adjacent to ring flange 4'' thereby effectively preventing oscillations or vibrations at the inner end of the tube. Bearing 8 is fitted in the front end of tube 4 so that the forward end of the bearing is set back in reference to the outside of cover 5. To assure a strong and reliable support for bearing 8, the portion of tube 4 supporting the bearing is reinforced, preferably by giving the respective tube portion a greater wall thickness. As is shown in the figure, the tube wall is stepped. It has its greatest thickness adjacent to cover 5 and is somewhat reduced but still enlarged in thickness up to the point at which the tube enters the gap between the stator and the rotor.

If desired, transparent windows may be provided in the casing bottom 1' and tube bottom 4'.

While the invention has been described in detail with respect to a certain now preferred example and embodiment of the invention, it will be understood by those skilled in the art, after understanding the invention, that various changes and modifications may be made without departing from the spirit and scope of the invention, and it is intended therefore to cover all such changes and modifications in the appended claims.

What is claimed as new and desired to be secured by Letters Patent is:

1. An electromotor comprising a generally cup-shaped casing, a stator and a rotor separated by an air gap, said stator and rotor being mounted within said casing and encapsulated by the same, a closure member made of plastic fitted in the open end of said casing to close the same, a sealing tube made of plastic fitted in said gap between the stator and the rotor to seal off the stator within the casing, one end of said tube being integral with said closure member.

2. An electromotor according to claim 1, wherein said sealing tube terminates at its other end in a bottom wall integral with the side wall of the tube, said bottom wall of the tube being adjacent to the bottom wall of the casing.

3. An electromotor according to claim 1 wherein the wall portion of the sealing tube adjacent to the closure member is of greater thickness than the remaining wall portion of the tube to reinforce said adjacent wall portion.

4. An electromotor according to claim 1 wherein a shoulder is secured on the inside of the bottom wall of the casing adjacent to the other end of the tube, said other tube end being supported on said shoulder slightly movable in axial direction, but restrained in transverse direction.

5. An electromotor according to claim 4 wherein said sealing tube has at its other end a bottom wall integral with the side wall of the tube, and wherein a ring flange is secured to the outside of said bottom wall of the tube coaxial with the axis of the tube, said flange slidably overlying said shoulder.

References Cited by the Examiner
UNITED STATES PATENTS

| | | | |
|---|---|---|---|
| 2,629,542 | 2/1953 | Dietler | 310—86 X |
| 2,752,517 | 6/1956 | Von Delden | 310—89 |
| 2,875,694 | 3/1959 | Carter | 310—86 X |
| 2,911,918 | 11/1959 | Reed | 310—86 |

ORIS L. RADER, *Primary Examiner.*

MILTON O. HIRSHFIELD, *Examiner.*

P. L. McBRIDE, D. F. DUGGAN, *Assistant Examiners.*